US010416758B2

(12) United States Patent
Tsuchie et al.

(10) Patent No.: US 10,416,758 B2
(45) Date of Patent: Sep. 17, 2019

(54) INFORMATION PROCESSING APPARATUS, INFORMATION PROCESSING SYSTEM, AND INFORMATION PROCESSING METHOD (71) Applicant: Sony Interactive Entertainment Inc., Tokyo (JP)

(72) Inventors: Tatsuo Tsuchie, Tokyo (JP); Shoichi Ikenoue, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 28 days.

(21) Appl. No.: 15/758,155

(22) PCT Filed: Oct. 26, 2016

(86) PCT No.: PCT/JP2016/081745
§ 371 (c)(1),
(2) Date: Mar. 7, 2018

(87) PCT Pub. No.: WO2017/077918
PCT Pub. Date: May 11, 2017

(65) Prior Publication Data
US 2018/0253142 A1 Sep. 6, 2018

(30) Foreign Application Priority Data
Nov. 2, 2015 (JP) ................ 2015-216128

(51) Int. Cl.
*G06F 16/00* (2019.01)
*G06F 3/01* (2006.01)
(Continued)

(52) U.S. Cl.
CPC ......... *G06F 3/012* (2013.01); *G02B 27/0172* (2013.01); *G06F 3/01* (2013.01);
(Continued)

(58) Field of Classification Search
CPC ..................... G06F 3/00; G06K 9/00
(Continued)

(56) References Cited

U.S. PATENT DOCUMENTS 7,222,045 B2 * 5/2007 Kourogi ............ G01C 17/38
702/141
8,018,483 B2 * 9/2011 Nakanishi ........... G02B 27/017
348/42
(Continued)

FOREIGN PATENT DOCUMENTS

EP         0999518 A1    5/2000
JP      2000350860 A    12/2000
(Continued)

OTHER PUBLICATIONS

Extended European Search Report for corresponding EP Application No. 16861980.7, 8 pages, dated Mar. 18, 2019.
(Continued)

*Primary Examiner* — Abolfazl Tabatabai
(74) *Attorney, Agent, or Firm* — Matthew B. Dernier, Esq.

(57) ABSTRACT

In an information processing apparatus, a posture data acquiring section acquires output values from a motion sensor of a head-mounted display. Effective rates of acceleration are then obtained by correcting the output values based on correction formulas. A posture is calculated in reference to the axes of the motion sensor based on the acquired rates of acceleration. Thereafter, the posture of the head-mounted display is calculated by performing rotation correction based on previously acquired angle errors, the calculated posture being output to an information processing section. A correction data updating section acquires posture information based on markers of the head-mounted display imaged in a captured image, and updates correction data for use in acquiring the posture from the sensor output values (Continued)

through comparison with the marker-based posture information.

11 Claims, 9 Drawing Sheets

(51) Int. Cl.
*G06F 3/0487* (2013.01)
*G06F 3/0346* (2013.01)
*G02B 27/01* (2006.01)
*G06K 9/00* (2006.01)
*G06K 9/03* (2006.01)
*G06T 7/00* (2017.01)

(52) U.S. Cl.
CPC .......... *G06F 3/0346* (2013.01); *G06F 3/0487* (2013.01); *G06K 9/00335* (2013.01); *G06K 9/03* (2013.01); *G02B 2027/014* (2013.01)

(58) Field of Classification Search
USPC ........................................................ 382/107
See application file for complete search history.

(56) References Cited

U.S. PATENT DOCUMENTS

| | | |
|---|---|---|
| 2003/0062675 A1 | 4/2003 | Noro |
| 2005/0168486 A1 | 8/2005 | Sato |
| 2007/0046805 A1 | 3/2007 | Nakanishi |
| 2015/0213573 A1 | 7/2015 | Mukawa |
| 2015/0261291 A1 | 9/2015 | Mikhailov |

FOREIGN PATENT DOCUMENTS

| | | |
|---|---|---|
| JP | 2003103045 A | 4/2003 |
| JP | 2007065899 | 3/2007 |
| JP | 2007310840 A | 11/2007 |
| JP | 2015041868 A | 3/2015 |
| WO | 2014034378 A1 | 3/2014 |

OTHER PUBLICATIONS

International Search Report for corresponding PCT Application No. PCT/JP2016/081745, 4 pages, dated Jan. 10, 2017.
International Preliminary Report on Patentability and Written Opinion for corresponding PCT Application No. PCT/JP2016/081745, 14 pages, dated May 17, 2018.

* cited by examiner

ND INFORMATION PROCESSING SYSTEM,
AND INFORMATION PROCESSING
METHOD

TECHNICAL FIELD

The present invention relates to information processing technology for processing information in response to movements in the real world.

BACKGROUND ART

There exist video games that involve capturing by a camera an image of a user's body and markers attached thereto and replacing a display region corresponding to the captured image with another image for display on a display device (e.g., see PTL 1). The techniques for analyzing not only the captured image but also measurements from various sensors attached to or held by the user and having the results of the analysis reflected in information processing such as games have gained widespread acceptance in extensive fields ranging from small game machines to leisure facilities.

CITATION LIST

Patent Literature

[PTL 1] European Published Patent No. EP0999518

SUMMARY

Technical Problems

For the above-mentioned techniques, it is always a major challenge how to accurately acquire information related to the posture and movements of a target object. For example, where a head-mounted display worn by a user on the head presents the user with a virtual world reflecting not only movements of the head but also changes in the user's visual field, how accurately to detect the posture and movements of the head is a challenge to be addressed in bringing about the expressions of a more realistic sensation and a higher sense of immersion. In addition to the problem of the expressions, detected values even slightly inconsistent with the posture of the head can cause the user to lose the sense of equilibrium during continuous viewing of the display image reflecting the detected values. This can be dangerous enough to adversely affect the user's physical condition.

The present invention has been made in view of the above circumstances. An object of the invention is therefore to provide techniques for acquiring information related to the posture of a target object easily and highly accurately.

Solution to Problems

According to one embodiment of the present invention, there is provided an information processing apparatus. The information processing apparatus includes an input information acquiring section configured to acquire output values from an acceleration sensor mounted on a target object, a posture data acquiring section configured to acquire posture information related to the target object by calculating rates of acceleration on axes of the acceleration sensor based on the output values so as to obtain inclination angles of the axes based on the calculated rates of acceleration, and an information processing section configured to perform information processing using the posture information before outputting output data generated as a result of the information processing. On the basis of angle errors between the axes of the acceleration sensor on the one hand and reference axes given to the target object on the other hand, the posture data acquiring section corrects the posture information related to the acceleration sensor in accordance with the posture information related to the target object.

According to another aspect of the present invention, there is provided an information processing system. The information processing system includes a head-mounted display, and an information processing apparatus configured to establish connection with the head-mounted display and to generate data of a display image. The information processing apparatus includes an input information acquiring section configured to acquire output values from an acceleration sensor mounted on the head-mounted display, a posture data acquiring section configured to acquire posture information related to the head-mounted display by calculating rates of acceleration on axes of the acceleration sensor based on the output values so as to obtain inclination angles of the axes based on the calculated rates of acceleration, and an information processing section configured to generate the data of the display image having a visual view being changed in accordance with posture using the posture information, the information processing section further outputting the display image data to the head-mounted display. The posture data acquiring section corrects the posture information related to the acceleration sensor in accordance with the posture information related to the head-mounted display on the basis of angle errors between the axes of the acceleration sensor on the one hand and reference axes given to the head-mounted display on the other hand.

According to a further aspect of the present invention, there is provided an information processing method. The information processing method includes the steps of acquiring output values from an acceleration sensor mounted on a target object, acquiring posture information related to the target object by calculating rates of acceleration on axes of the acceleration sensor based on the output values so as to obtain inclination angles of the axes based on the calculated rates of acceleration, and performing information processing using the posture information before outputting output data generated as a result of the information processing to another apparatus. On the basis of angle errors between the axes of the acceleration sensor on the one hand and reference axes given to the target object on the other hand, the posture information acquiring step corrects the posture information related to the acceleration sensor in accordance with the posture information related to the target object.

Incidentally, if other combinations of the above-outlined composing elements or the above expressions of the present invention are converted between different forms such as a method, an apparatus, a system, a computer program, and a recording medium that records the computer program, they still constitute effective embodiments of the present invention.

Advantageous Effect of Invention

According to the present invention, the information related to the posture of the target object is obtained easily and highly accurately.

DESCRIPTION OF EMBODIMENT

Figure 1:
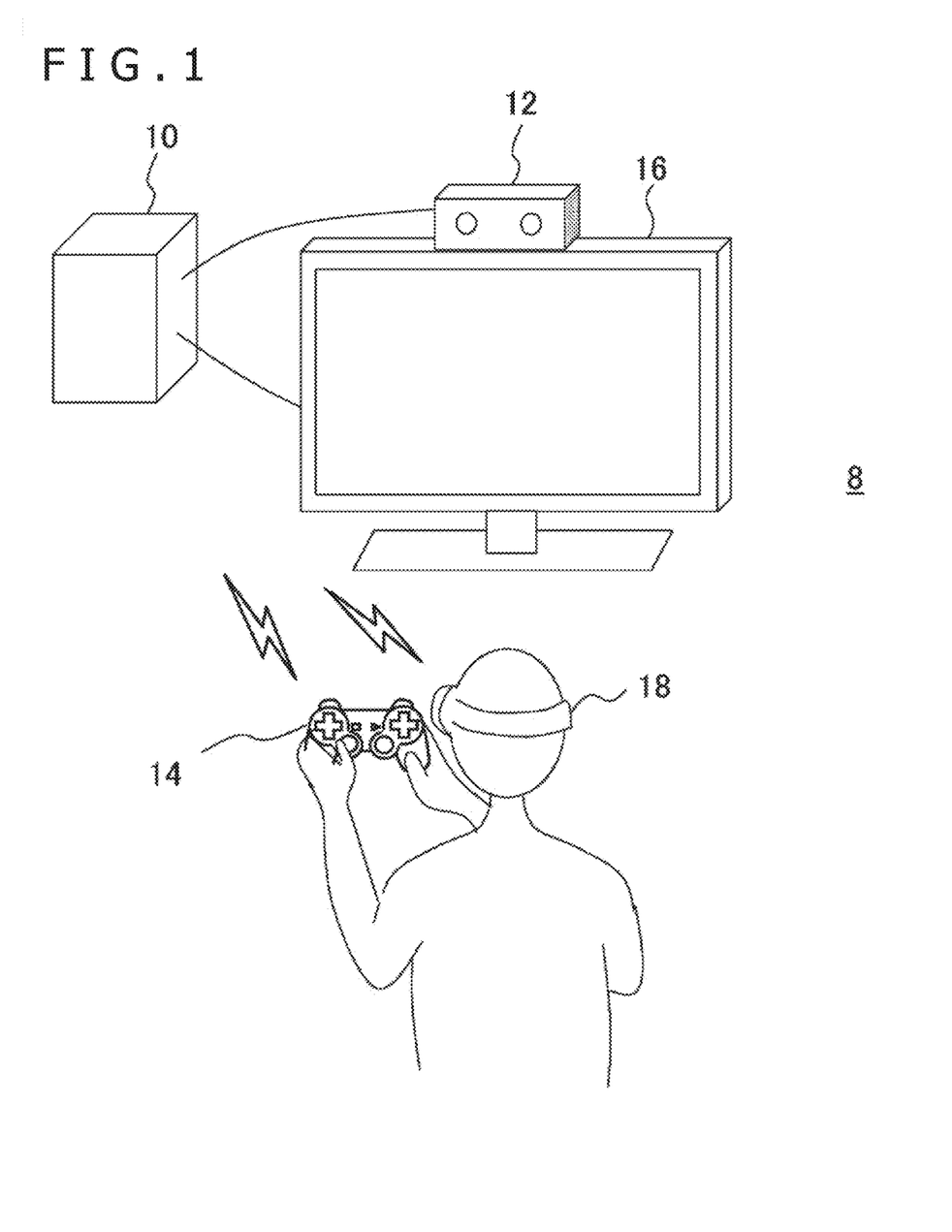
FIG. 1 is a schematic diagram depicting a typical configuration of an information processing system to which an embodiment of the present invention may be applied.

FIG. 1 depicts a typical configuration of an information processing system to which an embodiment of the present invention may be applied. An information processing system 8 includes an imaging device 12 that images the target object, an information processing apparatus 10 that performs information processing based on captured images, a flat-screen display device 16 that displays images resulting from the information processing, a head-mounted display (called the HMD hereunder) 18 that also displays such images, and an input device 14 operated by a user.

The information processing apparatus 10, the imaging device 12, the input device 14, the flat-screen display device 16, and the HMD 18 may be interconnected by cable or by known wireless communication technology such as Bluetooth (registered trademark). Depending on the information processing performed by the information processing apparatus 10, the input device 14 and the flat-screen display device 16 may be selectively introduced. The external shapes of these devices are not limited to what is illustrated in the drawing. At least two of the above-mentioned devices may be integrally formed. For example, the information processing apparatus 10, the input device 14, and the flat-screen display device 16 may be formed integrally in a portable terminal.

The HMD 18 is a display device worn by the user on the head and designed to display images on a display panel such as an organic electroluminescent (EL) panel positioned in front of the user's eyes. For example, the HMD 18 may present a stereoscopic image by generating parallax images as viewed from right and left points of view and by displaying the generated parallax images on bisected right and left regions of a display screen. Motion sensors such as an acceleration sensor and a gyro sensor are incorporated in or externally attached to the HMD 18. These sensors measure physical quantities related to the posture and movements of the user's head and transmit the measurements consecutively to the information processing apparatus 10. The HMD 18 may further incorporate speakers or earphones positioned against the user's ears for audio output thereto.

The imaging device 12 includes a camera that images the target object such as the user at a predetermined frame rate and a mechanism that generates output data of a captured image by performing known processes such as demosaicing on the signal output from the camera, the mechanism further outputting the generated output data to the information processing apparatus 10. The camera is a stereo camera that includes common visible light sensors such as charge-coupled device (CCD) sensors or complementary metal oxide semiconductor (CMOS) sensors positioned right and left at a predetermined distance apart.

The information processing apparatus 10 generates output data such as images and sounds by performing necessary information processing using measurements sent from the motion sensors of the HMD 18 and captured image data from the imaging device 12. The content of the processing performed by the information processing apparatus 10 is not limited to anything specific and may be determined as needed depending on the detailed functions and applications desired by the user. For example, a video game may be advanced in accordance with the movements and the input made by the user. Display images of the virtual world may be generated in such a manner that the visual field of the virtual world will change in keeping with head movements. The user's movements may be converted to command input for information processing.

The information processing apparatus 10 may acquire movements of the input device 14 using markers attached thereto. The information processing apparatus 10 may alternatively acquire the posture and movements of the user's head using means other than the motion sensors, such as by tracking multiple markers mounted on an external surface of the HMD 18. In such a case, the measurements from the motion sensors and those from the other means may be utilized in a complementary manner to improve the accuracy in detecting the posture and movements. As another alternative, as will be discussed later, information related to the head's posture acquired from marker images in a captured image may be used to correct the measurements from the motion sensors. The output data generated by the information processing apparatus 10 is transmitted at least either to the HMD 18 or to the flat-screen display device 16.

The flat-screen display device 16 may be a television (TV) set that has a display for outputting two-dimensional images and speakers for outputting sounds. For example, the flat-screen display device 16 may be a liquid crystal display TV set, an organic EL TV set, a plasma display TV set, or a personal computer (PC) display. In another example, the flat-screen display device 16 may be the display of a tablet terminal or a mobile terminal with speakers. The input device 14, when operated by the user, receives requests such as those for starting and ending processes, selecting functions, and inputting commands, and outputs the received request to the information processing apparatus 10 as an electrical signal.

The input device 14 may be any one of common input devices such as a game controller, a keyboard, a mouse, a joystick, a touch pad mounted on the display surface of the flat-screen display device 16, or a combination of these devices. The input device 14 may further include a light-emitting marker having an element emitting light in a predetermined color, or an aggregate of such light-emitting elements. In this case, the information processing apparatus 10 may track the movement of the marker using captured images and interpret the movement of the input device 14 as the user's operation. As another alternative, the input device 14 may be composed of only a light-emitting marker and a mechanism for holding that marker.

Figure 2:
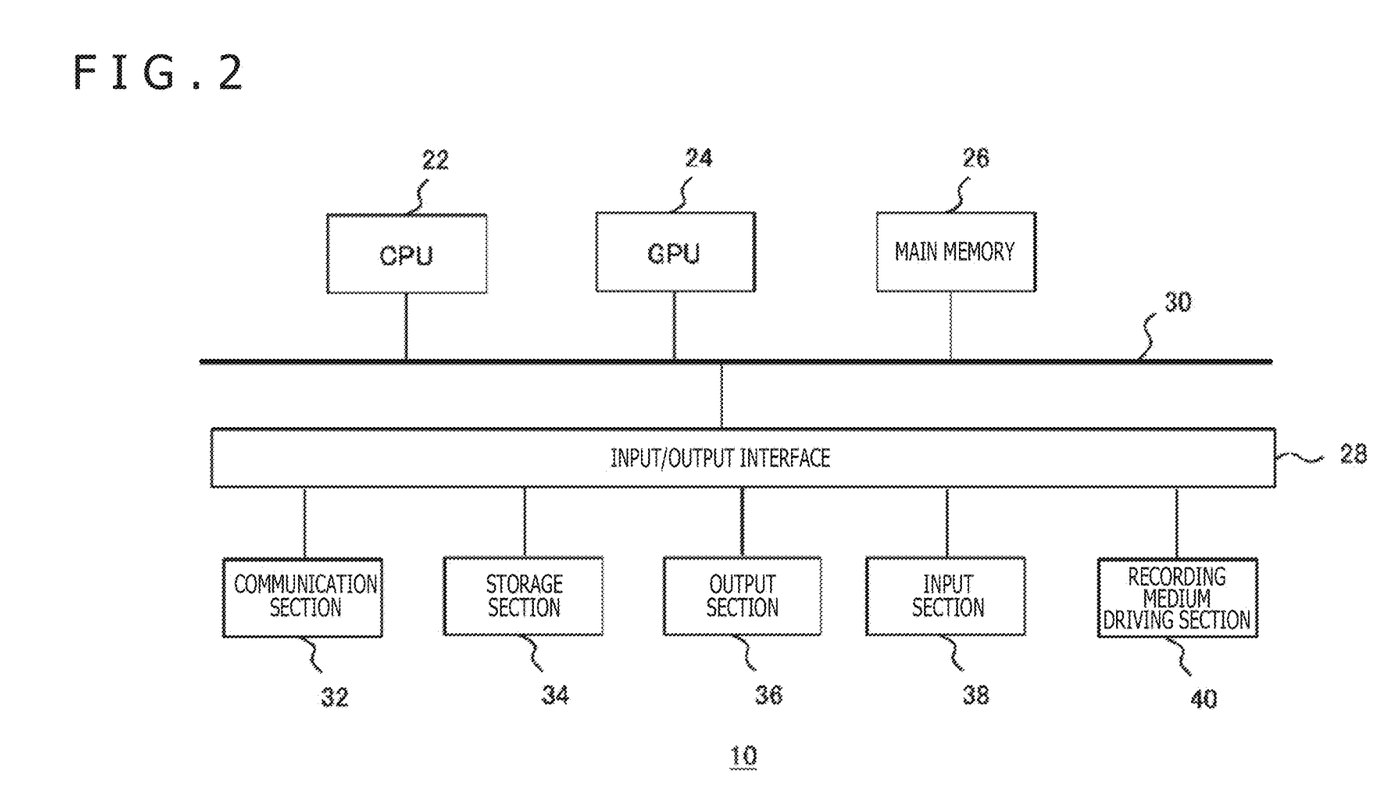
FIG. 2 is a block diagram depicting a typical internal circuit configuration of an information processing apparatus as one embodiment of the present invention.

FIG. 2 depicts an internal circuit structure of the information processing apparatus 10. The information processing apparatus 10 includes a central processing unit (CPU) 22, a graphics processing unit (GPU) 24, and a main memory 26. These components are interconnected via a bus 30. The bus 30 is also connected to an input/output interface 28. The input/output interface 28 is connected to peripheral device interfaces, such as a universal serial bus (USB) interface and an Institute of Electrical and Electronics Engineers (IEEE) 1394 interface; a communication section 32 made of a wired or wireless local area network (LAN) interface; a storage section 34, such as a hard disk drive or a nonvolatile memory; an output section 36 for outputting data to the flat-screen display device 16 and the HMD 18; an input section 38 for inputting data from the imaging device 12, the input device 14, or the HMD 18; and a recording medium driving section 40 that drives removable recording media, such as magnetic disks, optical disks, or semiconductor memories.

The CPU 22 controls the entire information processing apparatus 10 by executing the operating system stored in the storage section 34. The CPU 22 also executes various programs read from the removable recording medium and loaded into the main memory 26 or programs downloaded via the communication section 32. The GPU 24 has the function of a geometry engine and that of a rendering processor. In accordance with a rendering instruction from the CPU 22, the GPU 24 performs a rendering process and stores the resulting display image in a frame buffer (not depicted). The GPU 24 proceeds to convert the display image in the frame buffer into a video signal and output the video signal to the output section 36. The main memory 26 is composed of a random access memory (RAM) that stores the programs and data necessary for the processing.

Figure 3:
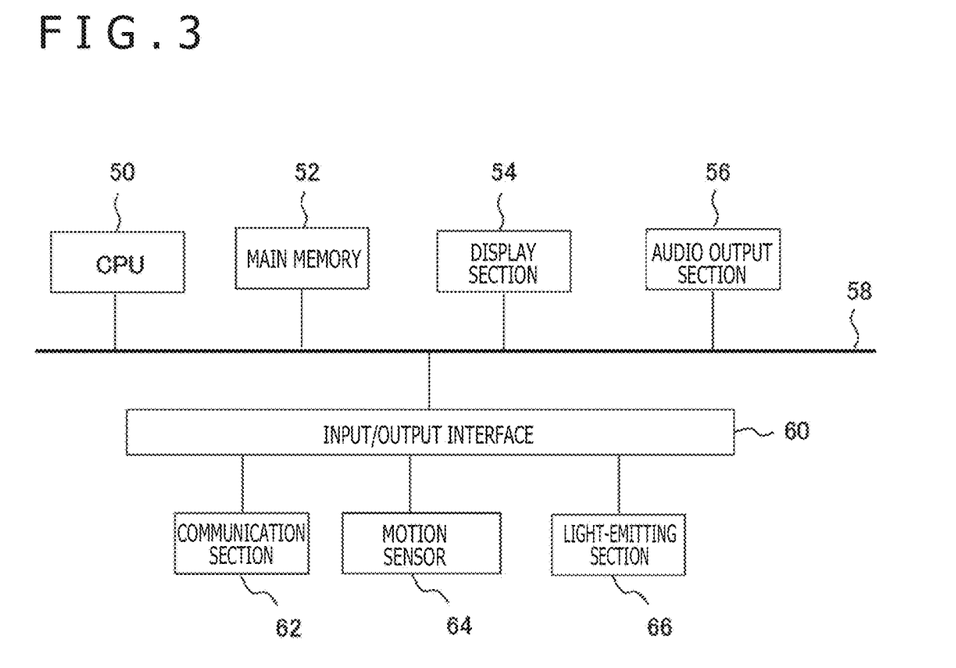
FIG. 3 is a block diagram depicting a typical internal circuit configuration of a head-mounted display (HMD) in the embodiment of the present invention.

FIG. 3 depicts an internal circuit structure of the HMD 18. The HMD 18 includes a CPU 50, a main memory 52, a display section 54, and an audio output section 56. These components are interconnected via a bus 58. The bus 58 is further connected to an input/output interface 60. The input/output interface 60 is connected to a communication section 62 made of a wired or wireless LAN network interface, a motion sensor 64, and a light-emitting section 66.

The CPU 50 processes the information acquired from the components of the HMD 18 via the bus 58 and feeds output data to the display section 54 and the audio output section 56. The main memory 52 stores the programs and data necessary for processing by the CPU 50. However, depending on the application to be executed or the design of equipment in use, the information processing apparatus 10 may carry out most of the processing, so that the HMD 18 only needs to output the data sent from the information processing apparatus 10. In this case, the CPU 50 and the main memory 52 may be replaced with simpler devices.

The display section 54 is configured with a display panel such as a liquid crystal display panel or an organic EL panel that displays images in front of the eyes of the user wearing the HMD 18. As mentioned above, a stereoscopic view may be implemented by displaying a pair of parallax images in the panel regions corresponding to the right and left eyes. The display section 54 may further include a pair of lenses positioned between the display panel and the eyes of the user wearing the HMD 18, the lenses acting to expand a viewing angle of the user. In this case, the display image is subjected to distortion correction such that the image will appear normally when viewed via the lenses on the information processing apparatus 10 or on the HMD 18.

The audio output section 56 includes speakers or earphones positioned where the use's ears are located when the HMD 18 is worn by the user, allowing the user to hear sounds. The number of audio channels for output is not limited. The audio output section 56 may have monaural, stereo, or surround speakers or headphones. The communication section 62 is an interface that transmits and receives data to and from the information processing apparatus 10 and the flat-screen display device 16. For example, the communication section 62 may be implemented using known wireless communication technology such as Bluetooth (registered trademark).

The motion sensors 64 are provided through the combination of an acceleration sensor and a gyro sensor, for example, and detect the posture and movements of the HMD 18. The results of the detection are transmitted to the information processing apparatus 10 via the communication section 62. The light-emitting section 66 is an element or an aggregate of elements emitting light in a predetermined color. Multiple light-emitting elements are attached to the external surface of the HMD 18. These light-emitting elements tracked as markers permit acquisition of the position of the HMD 18. Also, the posture of the HMD 18 is acquired on the basis of the number of marker images and the positional relations therebetween in the captured image.

Figure 4:
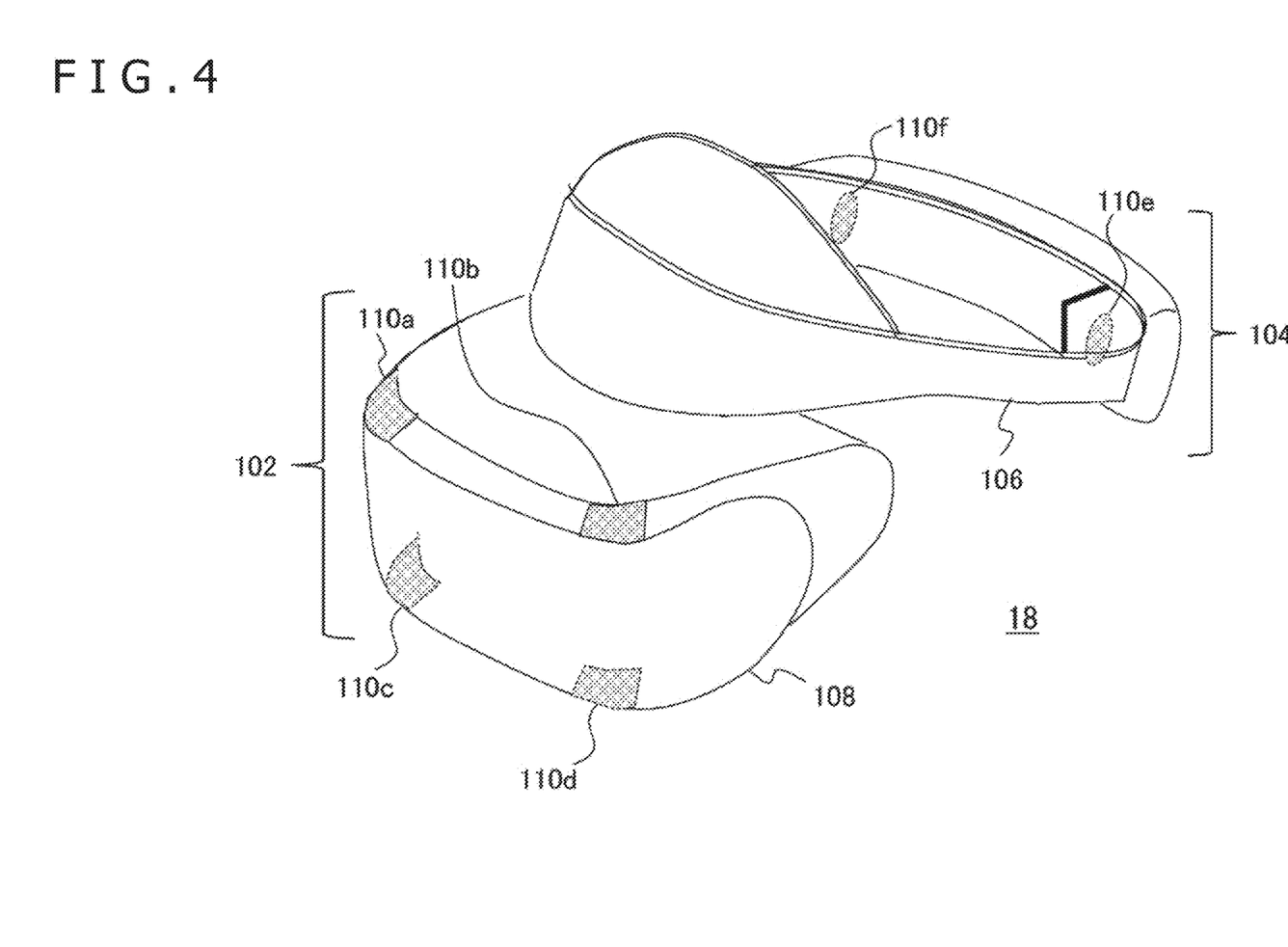
FIG. 4 is a schematic diagram depicting an external shape of the HMD in the embodiment of the present invention.

FIG. 4 depicts the appearance of the HMD 18. In this example, the HMD 18 is made up of an output mechanism section 102 and a wearing mechanism section 104. The wearing mechanism section 104 includes a wear band 106 worn by the user around the head to secure the device. The wear band 106 is made of a material adjustable in length to the circumference of the user's head or has such a structure. For example, the wear band 106 may be formed by an elastic body such as rubber or may employ a buckle or gear arrangement.

The output mechanism section 102 includes an enclosure 108 shaped to cover the user's right and left eyes when the HMD 18 is worn by the user. Inside the enclosure 108 is a display panel facing both eyes when the device is worn. Outside the enclosure 108 are light-emitting markers 110a, 110b, 110c, and 110d. Although the number of light-emitting markers and their locations are not limited, four light-emitting markers are arranged at the four corners of the enclosure front of the output mechanism section 102 in the present embodiment. Further, light-emitting markers 110e and 110f may also be arranged on both sides at the back of the wear band 106. The light-emitting markers 110c and 110d under the output mechanism section 102 and the light-emitting markers 110e and 110f outside the wear band 106 are not seen from the view of FIG. 4 and are thus indicated with broken lines depicting the circumferences of each marker.

The light-emitting markers indicate the position of the user on a plane of the captured image. When mounted on the HMD 18 as illustrated, the light-emitting markers are also used to acquire the posture of the head. For example, if the user faces straight at the imaging device 12, four light-emitting markers 110a, 110b, 110c, and 110d are imaged. If the user faces sideways, three light-emitting markers (e.g., light-emitting markers 110b, 110d, and 110e) are imaged. If the user faces backwards, then two light-emitting markers 110e and 110f are imaged.

Even if the user faces somewhere between these directions, the posture of the head in a three-dimensional (3-D) space of the HMD 18 can be estimated on the basis of the positional relations between marker images in the captured image for example, provided that the relationship between the posture of a 3-D model of the HMD 18 on the one hand and projections of the markers on an imaging plane on the other hand is obtained in the same manner as in computer graphics. The motion sensors 64, not depicted, are further incorporated in or externally attached to the HMD 18. What is fundamental for the present embodiment is to obtain both the angle relative to a gravity vector using the acceleration sensor as part of the motion sensors 64 and the direction of the face using the gyro sensor as another part of the motion sensors 64, and acquire the posture of the user's head.

The position of the head in the 3-D space is acquired on the basis of the positions of the marker images in the stereoscopic image captured by the stereo camera from the right and left points of view. When the position and posture of the head are acquired in this manner and the visual field of a virtual-world image displayed on the HMD 18 is varied accordingly, the user can experience the sensation of almost being inside the virtual world. When the posture is acquired, the accuracy of the acquisition may be improved by integrally obtaining the information related to the marker images in the captured image. The HMD 18 and the motion sensors 64 may not be integrally formed. For example, the motion sensors 64 may be attached to parts of the user's body so that the posture and movements of the body are detected thereby and turned into an image. The image thus generated may be displayed on the flat-screen display device 16. This also constitutes a setup to which the present embodiment may be applied.

In any setup, the measurements from the motion sensors 64, when even slightly inconsistent with reality, can significantly affect information processing and the resulting display. For example, in a displayed virtual world of a video game, the user may intend to advance straight but may find himself or herself moving in a slightly different direction, or the user may keep the head straight up but the visual field of the display image may appear slightly inclined. This can give the user a feeling of discomfort. Continuously watching a horizontally unbalanced image can cause the user to lose the sense of equilibrium and can even adversely affect the user's physical condition. In the present embodiment, correction is performed appropriately over an elapse of time between output events of values from one included sensor to another such as the acceleration sensor and gyro sensor before the posture of the head is acquired. This minimizes any error in detecting the angle of the posture so as to prevent the problem of losing the sense of equilibrium as much as possible.

Figure 5:
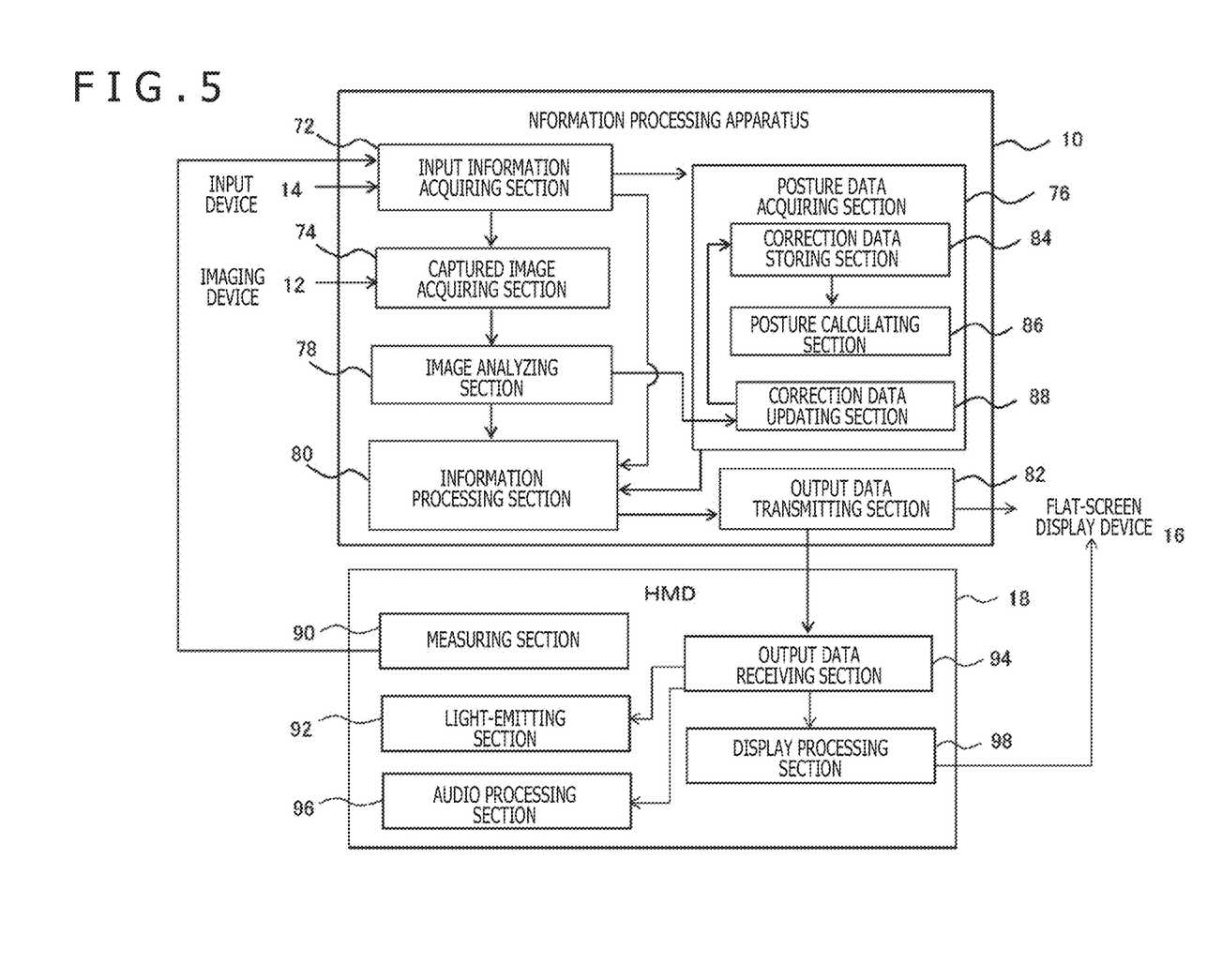
FIG. 5 is a block diagram depicting a configuration of functional blocks in the information processing apparatus as one embodiment of the present invention and in the HMD constituting a part thereof.

FIG. 5 depicts a configuration of functional blocks in the information processing apparatus 10 and the HMD 18. The functional blocks depicted in FIG. 5 are implemented in a hardware configuration that may include the CPU, GPU, various memories, display device, speakers, light-emitting elements, and sensors as illustrated in FIGS. 2 and 3. These functional blocks are also implemented in software as programs that are loaded typically from a recording medium into memory to provide a data input function, a data holding function, an image processing function, and a communication function, for example. Thus it will be understood by those skilled in the art that these functional blocks are realized by hardware alone, by software alone, or by a combination of both in diverse forms and are not limited to any of such forms.

The information processing apparatus 10 includes an input information acquiring section 72 that acquires information input from the input device 14 and the HMD 18, a captured image acquiring section 74 that acquires captured image data from the imaging device 12, a posture data acquiring section 76 that acquires data representing the posture of the user's head, an image analyzing section 78 that analyzes a captured image to track a target object, an information processing section 80 that performs information processing in accordance with the application being executed such as a video game, and an output data transmitting section 82 that transmits output data to the HMD 18 and the flat-screen display device 16.

The HMD 18 includes an output data receiving section 94 that receives output data transmitted from the information processing apparatus 10, a measuring section 90 composed of motion sensors and a communication mechanism, a light-emitting section 92 made up of light-emitting elements and a mechanism for controlling the emission of light therefrom, a display processing section 98 that displays images extracted from the output data received by the output data receiving section 94, and an audio processing section 96 that outputs sounds extracted from the output data.

The input information acquiring section 72 in the information processing apparatus 10 acquires detailed user operations from the input device 14. The user operations may include selection of the application to be executed, starting and ending of processing, input of commands, and other operations commonly performed during information processing.

Depending on the content of the information acquired from the input device 14, the input information acquiring section 72 feeds the information to the captured image acquiring section 74 or to the information processing section 80. Also, the input information acquiring section 72 receives motion sensor output values from the measuring section 90 in the HMD 18 and feeds the received values to the posture data acquiring section 76.

The captured image acquiring section 74 acquires at a predetermined frame rate the data of the captured image such as a stereoscopic image obtained by the imaging device 12 through video imaging. Also, the captured image acquiring section 74 may perform control to start or end imaging by the imaging device 12 in accordance with a processing start or end request obtained by the input information acquiring section 72 from the user. Depending on the result of the processing by the information processing section 80, the captured image acquiring section 74 may further control the type of data to be acquired from the imaging device 12.

On the basis of the sensor output values from the measuring section 90 in the HMD 18, the posture data acquiring section 76 acquires the posture and movements of the user's head at a predetermined rate and feeds what is acquired to the information processing section 80. The posture data acquiring section 76 includes a correction data storing section 84 acting as a storage area to store the data necessary for correction upon acquisition of the posture from the sensor output values (the data will be called "correction data" hereunder), a posture calculating section 86 that calculates the posture of the head from the sensor output values using the correction data, and a correction data updating section 88 that updates the correction data as needed. In the present embodiment, the correction is performed on two kinds of error: (1) an error stemming from the initial mounting of motion sensors; and (2) an error gradually taking place due to deterioration with age of the motion sensors. Specific ways to perform the correction will be discussed later.

The data for correcting the error in the category of (1) above is acquired during manufacturing of the HMD 18 and is stored into the correction data storing section 84 typically at the time of shipment. The data for correcting the error in the category of (2) above is provided by the correction data updating section 88 updating, as needed, the correction data stored in the correction data storing section 84 from the beginning. At this point, the correction data updating section 88 determines whether it is necessary to update the correction data by comparing two postures: the posture of the HMD 18 acquired as described above by the image analyzing section 78 from multiple marker images in the captured image, and the posture calculated by the posture calculating section 86. If the difference between the two postures is significantly large, the correction data updating section 88 updates the correction data in such a manner that the same posture as that acquired through image analysis will also be obtained from the motion sensor output values.

In subsequent corrections, the posture calculating section 86 uses the updated correction data. If there is a possibility that multiple HMDs 18 may be connected with the information processing apparatus 10, the correction data storing section 84 may store the correction data in association with individual identification information related to each of the HMDs 18 so that the correction data will be managed with respect to each HMD. If the initial values of the correction data are stored in an internal memory of the HMD 18 for example, the posture data acquiring section 76 loads the initial values retrieved from the memory into the correction data storing section 84 via the input information acquiring section 72 typically at the time of the initial connection.

The image analyzing section 78 detects the images of the markers on the HMD 18 from each frame of the captured image and acquires therefrom the position and posture of the user's head in the real space. The position of the head in the real space is identified by the distances from the imaging plane to the markers calculated in accordance with the positional relations between the relevant marker images in the stereoscopic image and by the positions of the marker images on the image plane. Existing techniques may be used in the process of identifying the position of the target object and in the process of tracking the object. The image analyzing section 78 feeds the information related to the acquired position and posture consecutively to the information processing section 80.

At a predetermined timing or at a point in time when requested by the correction data updating section 88 in the posture data acquiring section 76, the image analyzing section 78 supplies the correction data updating section 88 with the information related to the posture of the HMD 18 acquired on the basis of the number of marker images and the positional relations therebetween in the captured image. In turn, the correction data updating section 88 updates as needed the correction data stored in the correction data storing section 84.

The information processing section 80 performs predetermined information processing by suitably integrating the data about the head posture acquired by the posture data acquiring section 76 and the data about the position and posture of the user obtained by the image analyzing section 78. Most typically, a virtual world may be presented by advancing the ongoing game and varying its visual field in response to the movements of the user's head as described above. As long as the posture of the head is used, the content of information processing is not limited to anything specific. The information processing section 80 outputs the results of the information processing thus carried out as output data representing images and sounds. The output data transmitting section 82 successively acquires the output data generated by the information processing section 80 and, after modifying the acquired data as needed, feeds the data to at least either the HMD 18 or the flat-screen display device 16.

The output data receiving section 94 in the HMD 18 receives the output data from the information processing apparatus 10. Given the output data, the output data receiving section 94 feeds video data and audio data extracted therefrom to the display processing section 98 and to the audio processing section 96, respectively. As a result, the display panel included in the display processing section 98 outputs images, and the speakers included in the audio processing section 96 output sounds. The display processing section 98 may cut out a portion of the image thus generated for example and transmit the data of the cut-out portion to the flat-screen display device 16.

The measuring section 90, which includes the motion sensors 64 and the communication section 62 depicted in FIG. 3, transmits output values of the motion sensors 64 to the information processing apparatus 10 at a predetermined rate. The output values include such information as the rates of acceleration on a predetermined number of axes measured by the acceleration sensor and an angular velocity measured by the gyro sensor. The light-emitting section 92, which includes the light-emitting section 66 depicted in FIG. 3, causes it to function as light-emitting markers emitting light in a predetermined color. The color of emitted light may be designated by the information processing apparatus 10. In this case, the output data receiving section 94 acquires from the information processing apparatus 10 the data for designating the emitted-light color and sends the acquired data to the light-emitting section 92. For example, the emitted-light color may be changed in accordance with the user's identification information. This makes it possible to distinguish the heads of multiple users by emitted-light color. Likewise, the information processing apparatus 10 may further designate the emitted-light color of markers attached to the input device 14.

Figure 6:
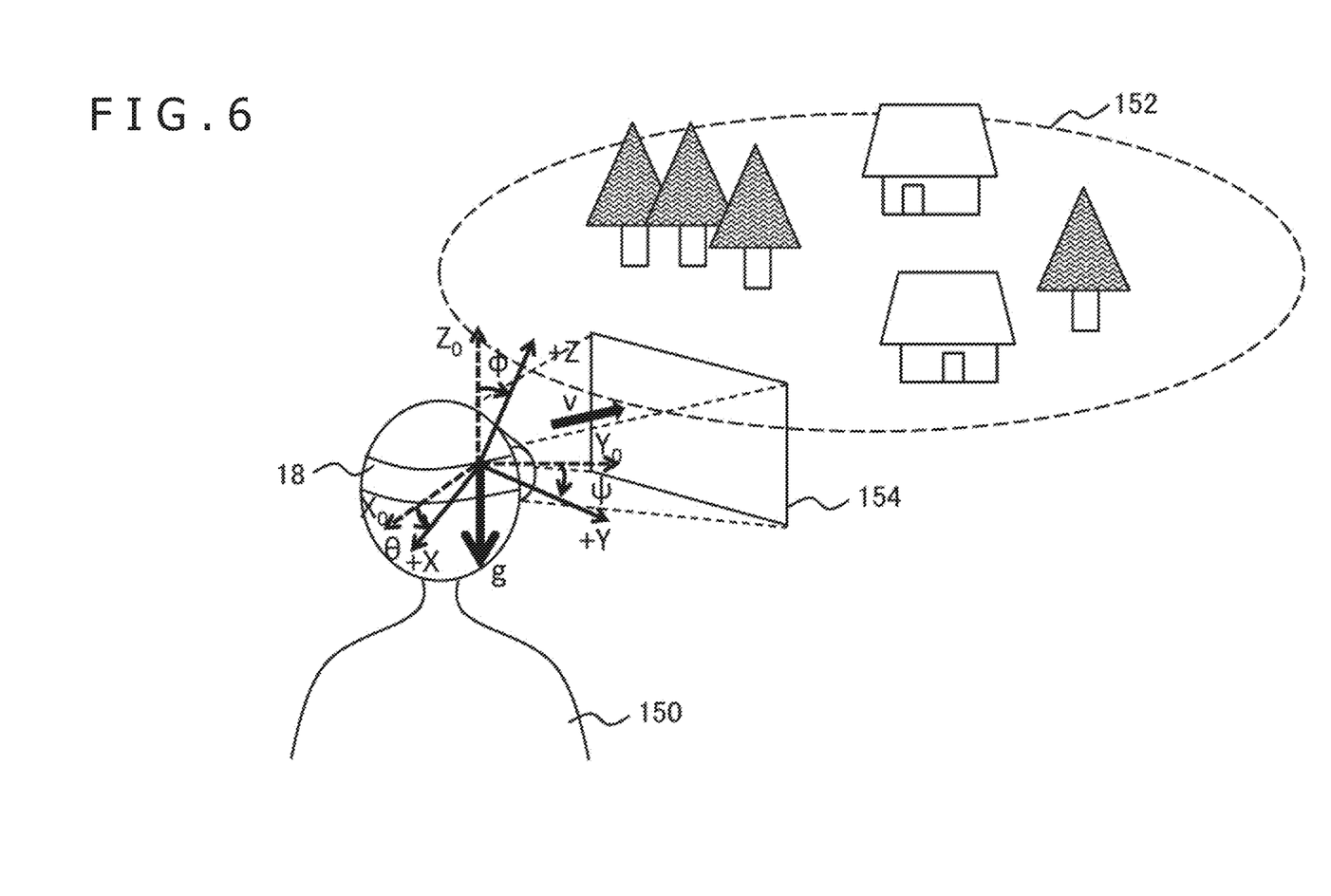
FIG. 6 is a schematic diagram explaining typical relations between display images on the one hand and rates of acceleration targeted for measurement with an acceleration sensor in the embodiment on the other hand.

FIG. 6 is a schematic diagram explaining typical relations between display images on the one hand and rates of acceleration targeted for measurement with the acceleration sensor on the other hand. This example depicts a user 150 wearing on the head the HMD 18 equipped with a three-axis acceleration sensor. The example indicates how the visual field of a virtual world 152 is changed in accordance with the posture of the user's head. Suppose that in a reference orthogonal coordinate system with a gravity vector g oriented vertically downward (where an $X_0$ axis and a $Y_0$ axis define a horizontal plane and a $Z_0$ axis is in the vertical direction), the X, Y, and Z axes of the acceleration sensor are inclined by angles $\theta$, $\psi$, and $\phi$, respectively. On that assumption, the relations between the rates of acceleration A(X), A(Y), and A(Z) to be measured on the one hand and the angles of the axes on the other hand are defined as follows:

[Math. 1]

$$\theta = \tan^{-1}\left(\frac{A(X)}{\sqrt{A(Y)^2 + A(Z)^2}}\right) \quad \text{(Expression 1)}$$

$$\psi = \tan^{-1}\left(\frac{A(Y)}{\sqrt{A(X)^2 + A(Z)^2}}\right)$$

$$\phi = \tan^{-1}\left(\frac{\sqrt{A(X)^2 + A(Y)^2}}{A(Z)}\right)$$

The posture of the acceleration sensor is obtained using the rates of acceleration on the axes measured as defined by the expression 1 above. The direction of the user's face is obtained by the gyro sensor. In this manner, the posture of the head of the user 150 is determined, and so is a directional vector v of the direction the user faces. A screen coordinate system is then determined accordingly, with the virtual word 152 projected onto a screen 154 set up corresponding to the system. This permits display of a virtual-world image of which the visual field is changed in keeping with the direction the user faces.

It is to be noted that the output values from the acceleration sensor contain an error stemming from individual differences between sensors and from the installed accuracy of substrates. Generally, this requires performing initial calibration upon manufacture of the acceleration sensor to thereby determine correction formulas for obtaining effective rates of acceleration from the output values. If the output values from the acceleration sensor on the axes are assumed to be $A_{out}(X)$, $A_{out}(Y)$, and $A_{out}(Z)$, then the correction formulas are given as follows:

$$A(X) = S_X \times A_{out}(X) + B_X$$

$$A(Y) = S_Y \times A_{out}(Y) + B_Y$$

$$A(Z) = S_Z \times A_{out}(Z) + B_Z$$

where, $S_X$, $S_Y$, and $S_Z$ stand for scale values and $B_X$, $B_Y$, and $B_Z$ for bias values. These values constitute part of the correction data.

Figure 7:
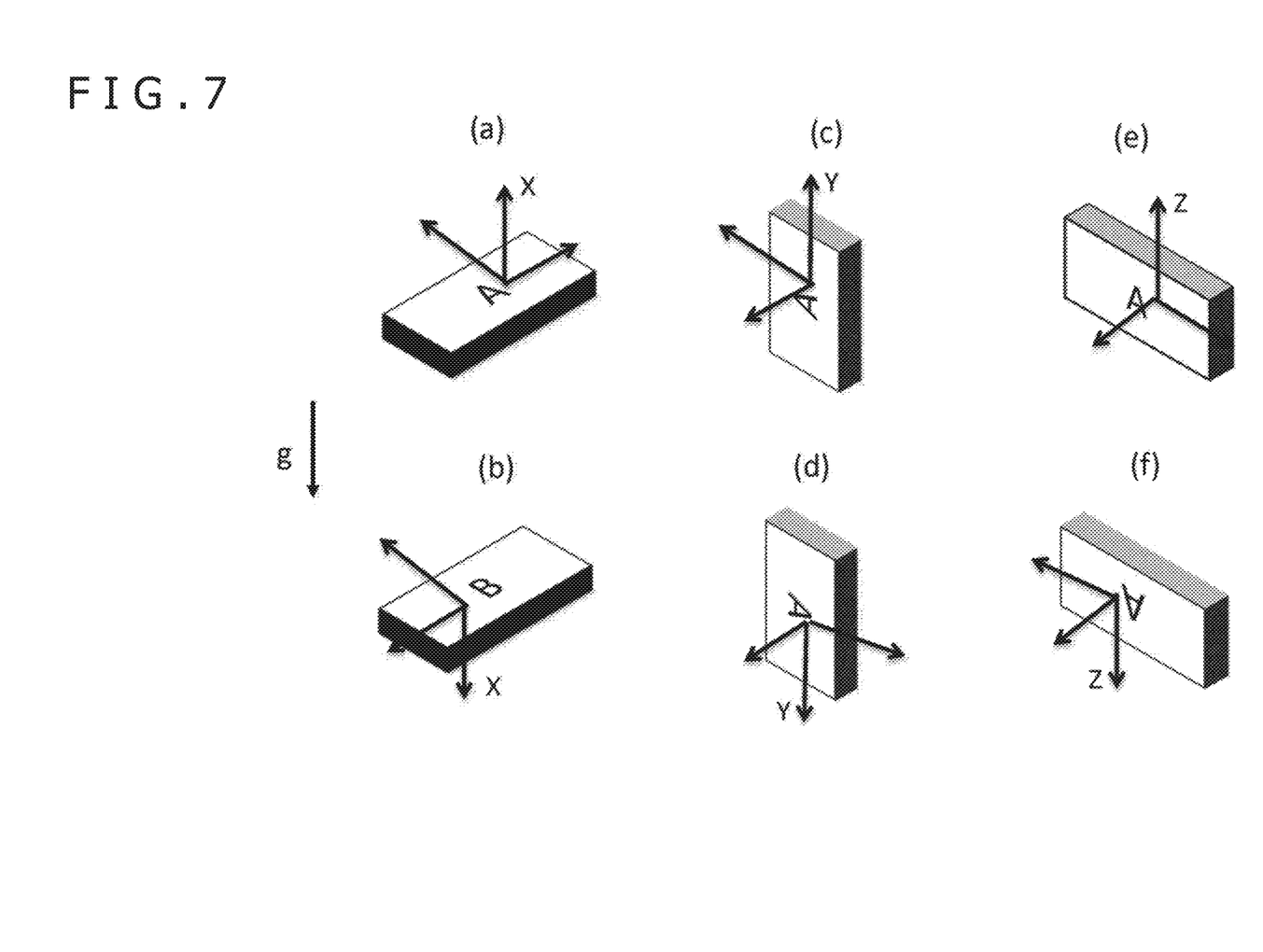
FIG. 7 is a schematic diagram explaining the technique for obtaining correction formulas through calibration with the embodiment.

FIG. 7 is a schematic diagram explaining the technique for obtaining correction formulas through calibration. The calibration involves acquiring the output values of the acceleration sensor fixed with jigs in six directions as illustrated. Specifically, in the states (a) and (b) of FIG. 7 in which the positive direction of the X axis is vertically upward and downward individually, the output values $A_{out}(X+)$ and $A_{out}(X-)$ on the X axis are acquired. In the states (c) and (d) in which the positive direction of the Y axis are vertically upward and downward individually, the output values $A_{out}(Y+)$ and $A_{out}(Y-)$ on the Y axis are measured. In the states (e) and (f) in which the positive direction of the Z axis is vertically upward and downward individually, the output values $A_{out}(Z+)$ and $A_{out}(Z-)$ on the Z axis are measured.

For example, the rate of acceleration A(X) on the X axis is expected to be −g in the state (a) and +g in the state (b), so that the following expressions are formulated with respect to these states:

$$-g = S_X \times A_{out}(X+) + B_X$$

$$+g = S_X \times A_{out}(X-) + B_X$$

The scale value $S_X$ and the bias value $B_X$ are obtained by solving the above simultaneous equations. The same applies to the Y axis and the Z axis as well. As a result of this, the scale values $S_X$, $S_Y$, and $S_Z$ and the bias values $B_X$, $B_Y$, and $B_Z$ are obtained.

Theoretically, the calibration carried out as described above improves the accuracy in acquiring the posture. However, when the posture is reflected in the display image as with the present embodiment, even a minuscule error of approximately 1 degree can give the user the above-mentioned feeling of discomfort. In particular, a display setup such as the HMD offering a sense of immersion can adversely affect the user's physical condition. Even after the above-described initial calibration, there still can occur a small error stemming from diverse factors including the accuracy in using jigs or making measurements during calibration and the accuracy in attaching the sensor to the HMD 18.

Figure 8:
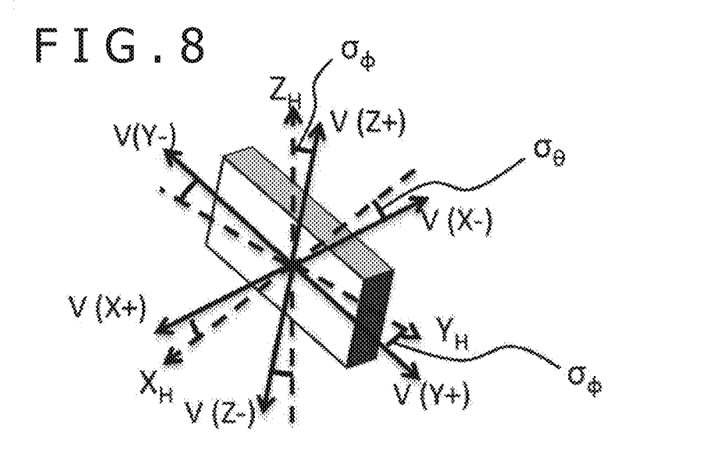
FIG. 8 is a schematic diagram explaining the principle of performing rotation correction with the embodiment.

Accordingly, more correction data is acquired with the acceleration sensor attached to the HMD 18 so that the error may be minimized. Specifically, the mounting angle of the acceleration sensor is assumed to include a minuscule error. On that assumption, rotation correction is carried out on the posture obtained from the acceleration in such a manner as to offset the error. Thus on the basis of the posture of the acceleration sensor, the posture of not only the HMD 18 but also the user's head is acquired accurately. The error stemming from the above-mentioned factors following sensor installation also applies to the other sensors such as the gyro sensor included in the motion sensors 64. The same correction data may then be used to correct the output values from the other sensors as well. This permits more accurate acquisition of the directional vector v of the direction the user faces, for example. FIG. 8 is a schematic diagram explaining the principle of performing rotation correction. First, with the acceleration sensor mounted on the HMD 18, the HMD 18 is fixed corresponding to each of the directions (a) to (f) in FIG. 7. Then the output values on the three axes of the acceleration sensor are acquired.

These output values are corrected using the scale values $S_X$, $S_Y$, and $S_Z$ and the bias values $B_X$, $B_Y$, and $B_Z$ mentioned above. If the acceleration sensor is installed with no error, it is in the same state as that of the initial calibration described above. In that case, the rates of acceleration A(X), A(Y), and A(Z) after the correction are either +g or −g in the X axis direction in the states (a) and (b) of FIG. 7, in the Y axis direction in the states (c) and (d), and in the Z axis direction in the states (e) and (f). In the other axial directions, the rates of acceleration A(X), A(Y), and A(Z) are 0. On the other hand, where there exits an error, even if the HMD 18 is fixed corresponding to the states (a) to (f) in FIG. 7, the axes have angles relative to the vertical direction due to a slight inclination of the acceleration sensor. As a result, the rates of acceleration turn out to be some other values.

That is, given these rates of acceleration, the axial inclinations of the acceleration sensor are obtained as acceleration vectors in the six states in which the initial coordinate axes of the HMD 18 are made to coincide with the gravity vector. The inclination angles of the axes are related to the rates of acceleration A(X), A(Y), and A(Z) in a manner defined by the expression 1 above. It is assumed here that with the HMD 18 fixed corresponding to the states (a) to (f) in FIG. 7, the acceleration vectors given by the acceleration sensor are V(X+), V(X−), V(Y+), V(Y−), V(Z+), and V(Z−). In FIG. 8, with these states integrated, the inclinations of the acceleration vectors are depicted simultaneously relative to an $X_H$ axis, a $Y_H$ axis, and a $Z_H$ axis of the HMD 18. Because there is a difference θ of 180 degrees between the states (a) and (b) in FIG. 7, the acceleration vectors V(X+) and V(X−) are theoretically in opposite directions but on the same straight line. This line constitutes the X axis of the acceleration sensor.

Likewise, the acceleration vectors V(Y+) and V(Y−) constitute the Y axis of the acceleration sensor, and the acceleration vectors V(Z+) and V(Z−) make up its Z axis. If there is no error in mounting the acceleration sensor, its X, Y, and Z axes coincide with the coordinate axes of the HMD 18. If the acceleration sensor is slightly inclined for example, the orthogonal coordinates on the X, Y, and Z axes occur rotated by the amount of the inclination with respect to the orthogonal coordinates of the HMD 18. To counter this aberration, error angles $\sigma_\theta$, $\sigma_\psi$, and $\sigma_\phi$ of the axes are obtained beforehand and stored into the correction data storing section 84.

In operation, the posture calculating section 86 using the expression 1 above obtains the posture from the rates of acceleration based on the output values from the acceleration sensor, and subtracts the errors involved from the respective angles to accurately calculate the posture of not only the HMD 18 but also the user's head in particular. Similar correction is carried out on the angle information presented by any other sensor. It might not be possible, however, to obtain the linearity of the acceleration vectors constituting any one axis of the acceleration sensor or the orthogonality between its axes due to factors other than the installation error. For example, the acceleration vectors V(Z+) and V(Z−) may not constitute a straight line, or either of the two vectors may not be clearly orthogonal to the X axis or the Y axis.

In that case, the acceleration vectors, if rotated uncorrected, fail to coincide with the orthogonal coordinate axes of the HMD 18. This aberration may be countered by removing these acceleration vectors from the calculation of the error angles $\sigma_\theta$, $\sigma_\psi$, and $\sigma_\phi$. For example, any one axis considered aberrant may be identified in terms of linearity and orthogonality. The remaining two axes may then be rotated to obtain their error angles in such a manner that the two axes coincide with the corresponding axes of the HMD 18. Depending on the content of information processing such as video games, the axis subject to a large angular variation may be limited. In this case, the error angle of the limited axis may be obtained in such a manner that the axis is preferentially made to coincide with the corresponding axis of the HMD 18. Such measures effectively improve the accuracy of posture detection.

Alternatively, with the angle of each acceleration vector acquired relative to the corresponding axis of the HMD 18, the error angles of the axes involved may be averaged to find a mean error angle for each axis. As another alternative, the error angle may be calculated from the amount of rotation on a given axis coming closest to any axis of the HMD 18. It is also possible to exclude, from the posture calculation during operation, any axis on which the rate of acceleration is clearly aberrant in terms of linearity of the acceleration vector to be had on the same axis or in terms of orthogonality between the axes involved.

Figure 9:
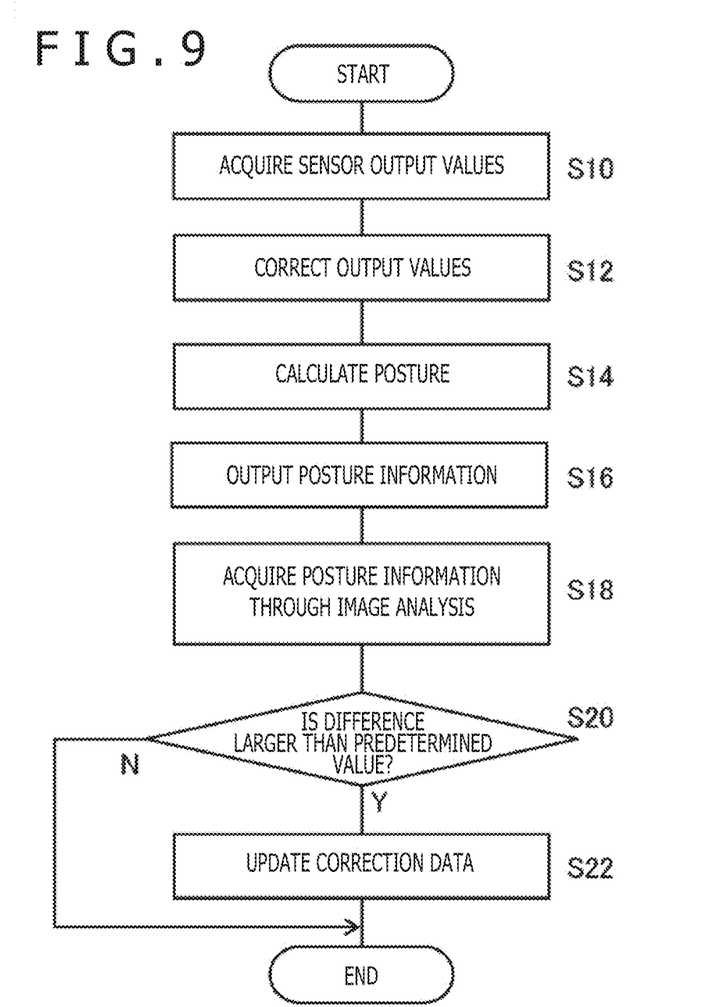
FIG. 9 is a flowchart depicting the procedure of a posture acquiring process performed by a posture data acquiring section of the embodiment.

Explained below is the operation carried out by the configuration described above. FIG. 9 is a flowchart depicting the procedure of a posture acquiring process performed by the posture data acquiring section 76, the posture acquiring process including a correction data updating process executed by the correction data updating section 88. Incidentally, the posture data acquiring section 76 may generate or integrate information as needed from the measurements made by the other sensors, not depicted, besides the acceleration sensor, the sensors being included in the motion sensors mounted on the HMD 18.

First, the posture calculating section 86 acquires the output values from the acceleration sensor of the HMD 18 (S10). The posture calculating section 86 corrects the output values by referencing the correction data stored in the correction data storing section 84 (S12). Specifically, the posture calculating section 86 calculates the effective rates of acceleration by substituting the output values on the axes for correction formulas that include scale values and bias values prepared in advance. At this point, where multiple HMDs 18 are allowed to be connected with the information processing apparatus 10, the posture calculating section 86 first acquires the individual identification information related to each HMD 18 before referencing the correction data associated with the acquired individual identification information. This applies not only to the scale values and bias values but also to the angle errors.

The posture calculating section 86 then calculates the inclination angles $\theta$, $\psi$, and $\phi$ relative to the reference orthogonal coordinate system, i.e., calculates the posture using the expression 1 above (S14). At this point, the posture calculating section 86 obtains the head posture accurately from the posture of the acceleration sensor by carrying out rotation correction on the output values by the amounts of the error angles $\sigma_\theta$, $\sigma_\psi$, and $\sigma_\phi$ stored in the correction data storing section 84. Similar rotation correction is carried out on the angle-related output values from the other sensors. The posture information thus calculated is output to the information processing section 80 (S16). Meanwhile, the correction data updating section 88 acquires from the image analyzing section 78 the information related to the posture of the HMD 18 obtained as a result of analyzing the captured image (S18). This information is acquired, as mentioned above, typically by geometric calculations using computer graphics technology based on the number of marker images of the HMD 18 and on the positional relations between the marker images in the captured image.

Next, the correction data updating section 88 compares the posture obtained in step S14 based on the motion sensors with the posture acquired as a result of image analysis to determine whether or not the difference therebetween is larger than a predetermined threshold value (S20). For example, angles are compared on each of the axes. If there is any axis on which the difference between the compared angles is larger than the predetermined threshold value, that axis is identified. If there is no such axis, the processing is terminated (N in S20). If there is an axis on which the difference between the compared angles is larger than the predetermined threshold value (Y in S20), the correction data updating section 88 updates the correction data in the correction data storing section 84 in such a manner that the angle conforming to the posture obtained by image analysis is acquired (S22). For example, the correction data updating section 88 may back-calculate the expression 1 above to obtain rates of acceleration that permit acquisition of the angle based on image analysis, and update the bias values in such a manner as to obtain these rates of acceleration from the output values of the acceleration sensor. However, the target to be corrected is not limited to the bias values. The scale values and the error angles for use in rotation correction may also be considered the target to be corrected.

Repeating steps S10 to S22 at a predetermined frequency permits continuous acquisition of the posture of not only the HMD 18 but also the user's head. The acquired posture is reflected in the result of information processing such as in the display image. Even if the correction data is subject to secular changes even during operation, the effects of such changes are minimized. Although the illustrated example depicts that the process of calculating and outputting the posture and the process of updating correction data are performed in series, the two processes may alternatively be carried at independent timings in practice. For example, the posture information based on image analysis may be accumulated for a predetermined time period. When the difference between the posture based on the accumulated information and the posture derived from the acceleration sensor has come to be larger than a predetermined threshold value for a predetermined time period, the correction data may be updated.

As described above, where the posture information is corrected on the basis of the result of image analysis, the correction data for permitting acquisition of the corrected posture is obtained and stored. The data is used next time the processing is carried out so that the accuracy of posture acquisition will be sustained. Because the difference between the stored posture information and the posture information based on image analysis is corrected in a short time, the amount of correction at one time is reduced even if secular changes continue. There is thus no need to carry out time-consuming, massive correction. Such secular changes may appear only on a particular axis in consequence of the process of manufacturing acceleration sensors, for example.

If information identifying an axis that is subject to larger secular changes than the other axes or which proves aberrant when measurements are made thereon is obtained typically from product information describing the characteristics of motion sensors, or if such an axis is detected by actual measurements, the motion sensors may be mounted on the HMD 18 in such a manner that the aberrant axis is oriented in a particular direction in consideration of easy human perception. For example, the aberrant axis is oriented vertically so that its secular changes will be minimized in detecting angles relative to a horizontal plane. This stabilizes the angle in the horizontal direction that is most sensitively perceived, which implements the display of images free of discomfort for a long time.

If there is an order in which the amounts of secular changes or the accuracy levels of the three axes are presented, the acceleration sensor may be mounted so that its axes are set up in descending order of amounts of secular changes or in ascending order of accuracy levels, e.g., in a vertical, front-back, or crosswise direction. When the axes are thus established in descending order of difficulty in perceiving the aberration thereof, the adverse effects of the characteristics of the acceleration sensor are minimized. The mounting direction of the acceleration sensor may be determined in consideration of least adverse effects of the aberrant axis, with the inclination in a particular direction not reflected in the result of the information processing such as in a video game, or with the user's movements on the aberrant axis kept minimal for example, in addition to taking into account the difficulty of perceiving the aberration.

With the above-described embodiment implementing techniques for detecting the posture of the target object using motion sensors, rotation errors are acquired and stored besides the scale values and bias values for converting the output values of the acceleration sensor into rates of acceleration. In operation, the posture of the target object is accurately acquired using the stored values so as to carry out rotation correction on the angle information obtained from the acceleration sensor and other sensors. This makes it possible to minimize the effects of the errors stemming from various factors such as individual differences of the sensors, installed accuracy levels, and accuracy of jigs for calibration.

In the setup where the motion sensors are attached to the HMD so that the HMD displays images of which the visual field is varied in response to the user's head movements, the user is liable to experience a feeling of discomfort as well as worsening of physical conditions if presented with a world depicting even a minuscule error of approximately 1 degree with respect to reality. This aberration is effectively countered by the above-described configuration. In operation, the correction data is updated as needed in comparison with the posture information obtained by means other than the motion sensors about the same target object. For example, with the motion sensors attached to the HMD, multiple markers are also mounted on the HMD. The posture of the user's head is then acquired separately on the basis of the number of marker images and the positional relations therebetween in the captured image.

Where the separately acquired posture information is used to update the correction data as needed, the effects of secular changes in the sensors are minimized, and an appropriate state is easily sustained. If it is known beforehand that secular changes are more pronounced or that the accuracy of measurement is lower on a certain axis than on the other axes, then the aberrant axis is set up vertically for example, or in a particular direction selected to be least amenable to perception. This minimizes the adverse effects on the user such as a feeling of discomfort with regard to images displayed in the visual field reflecting the posture. Because the relatively inexpensive acceleration sensor may be used, the manufacturing costs of the system are reduced.

The present invention has been described above in conjunction with a specific embodiment. It is to be understood by those skilled in the art that suitable combinations of constituent elements and processes of the embodiment described above as an example may lead to further variations of the present invention and that such variations also fall within the scope of the present invention.

For example, although the present embodiment has been described as being implemented through the combination of rotation correction based on angle errors, updating of correction data using the result of image analysis, and determination of the mounting direction reflecting the characteristics of sensor axes, such constituent operations may each be implemented independently. In such a case, the independently implemented operations still permit stable and highly precise acquisition of the posture information.

REFERENCE SIGNS LIST

8 Information processing system, 10 Information processing apparatus, 12 Imaging device, 14 Input device, 16 Flat-screen display device, 18 HMD, 22 CPU, 24 GPU, 32 Communication section, 54 Display section, 56 Audio output section, 62 Communication section, 64 Motion sensor, 66 Light-emitting section, 72 Input information acquiring section, 74 Captured image acquiring section, 76 Posture data acquiring section, 78 Image analyzing section, 80 Information processing section, 82 Output data transmitting section, 84 Correction data storing section, 86 Posture calculating section, 90 Measuring section, 92 Light-emitting section, 94 Output data receiving section, 96 Audio processing section, 98 Display processing section.

INDUSTRIAL APPLICABILITY

As described above, the present invention is applicable to a game machine, an information processing apparatus, an object recognition apparatus, a head-mounted display, and a system that includes any one of these devices and apparatuses, among others.

The invention claimed is:
1. An information processing apparatus comprising:
an input information acquiring section configured to acquire output values from an acceleration sensor mounted on a target object;
a posture data acquiring section configured to acquire posture information related to the target object by calculating rates of acceleration on axes of the accel- eration sensor based on the output values so as to obtain inclination angles of the axes based on the calculated rates of acceleration; and an information processing section configured to perform information processing using the posture information before outputting output data generated as a result of the information processing, wherein, on the basis of angle errors between the axes of the acceleration sensor on the one hand and reference axes given to the target object on the other hand, the posture data acquiring section corrects the posture information related to the acceleration sensor in accordance with the posture information related to the target object.

2. The information processing apparatus according to claim 1, further comprising:

a correction data storing section configured to store, as the angle errors, amounts of angular change of multiple axes of the acceleration sensor being rotated simultaneously until the axes coincide with the corresponding axes from among multiple reference axes given to the target object, wherein the posture data acquiring section performs the correction by referencing the angle errors stored in the correction data storing section.

3. The information processing apparatus according to claim 2, wherein the correction data storing section stores the angle errors in association with individual identification information related to a device as the target object mounted with the acceleration sensor, and the posture data acquiring section acquires the individual identification information related to the device mounted with the acceleration sensor from which the output values were acquired, the posture data acquiring section further referencing the angular errors associated with the acquired individual identification information.

4. The information processing apparatus according to claim 2, further comprising:

a correction data updating section configured to acquire posture information generated by means other than the acceleration sensor regarding the same target object and compare the posture information thus acquired with the posture information acquired by the posture data acquiring section in order to update correction data for use until the posture data acquiring section acquires the posture information from the output values, the correction data updating section further storing the updated data into the correction data storing section.

5. The information processing apparatus according to claim 4, wherein the correction data updating section updates at least one of parameters for use in correction formulas for calculating the rates of acceleration based on the output values.

6. The information processing apparatus according to claim 1, wherein the posture data acquiring section corrects the posture information using the angle errors calculated beforehand by assuming as an axis of the acceleration sensor a line formed by connecting two acceleration vectors presented by the acceleration sensor in a state where reference axes given to the target object are made to coincide with a gravity vector in positive and negative directions.

7. The information processing apparatus according to claim 1, wherein the posture data acquiring section corrects, on the basis of the angle errors, the output values from another sensor mounted along with the acceleration sensor with a view to measuring angle-related values, the posture data acquiring section further integrating the corrected output values with the posture information.

8. An information processing system comprising:
a head-mounted display; and
an information processing apparatus configured to establish connection with the head-mounted display and to generate data of a display image,
wherein the information processing apparatus includes
an input information acquiring section configured to acquire output values from an acceleration sensor mounted on the head-mounted display,
a posture data acquiring section configured to acquire posture information related to the head-mounted display by calculating rates of acceleration on axes of the acceleration sensor based on the output values so as to obtain inclination angles of the axes based on the calculated rates of acceleration, and
an information processing section configured to generate the data of the display image having a visual view being changed in accordance with posture using the posture information, the information processing section further outputting the display image data to the head-mounted display, and
the posture data acquiring section corrects the posture information related to the acceleration sensor in accordance with the posture information related to the head-mounted display on the basis of angle errors between the axes of the acceleration sensor on the one hand and reference axes given to the head-mounted display on the other hand.

9. The information processing system according to claim 8, wherein the acceleration sensor is mounted on the head-mounted display in a direction corresponding to the characteristics acquired of each of the axes.

10. The information processing system according to claim 9, wherein the acceleration sensor is mounted in such a manner that an axis of the acceleration sensor subject to a larger amount of secular change than the other axes is in a perpendicular direction of the head-mounted display worn by a user.

11. An information processing method comprising:
acquiring output values from an acceleration sensor mounted on a target object;
acquiring posture information related to the target object by calculating rates of acceleration on axes of the acceleration sensor based on the output values so as to obtain inclination angles of the axes based on the calculated rates of acceleration; and
performing information processing using the posture information before outputting output data generated as a result of the information processing to another apparatus,
wherein, on the basis of angle errors between the axes of the acceleration sensor on the one hand and reference axes given to the target object on the other hand, the acquiring the posture information corrects the posture information related to the acceleration sensor in accordance with the posture information related to the target object.

* * * * *